US011361574B2

(12) United States Patent
Boon et al.

(10) Patent No.: US 11,361,574 B2
(45) Date of Patent: Jun. 14, 2022

(54) SYSTEM AND METHOD FOR MONITORING FOR DRIVER PRESENCE AND POSITION USING A DRIVER FACING CAMERA

(71) Applicant: Bendix Commercial Vehicle Systems, LLC, Elyria, OH (US)

(72) Inventors: Cathy L. Boon, Irvine, CA (US); Zheng Li, Irvine, CA (US); Hans M. Molin, Irvine, CA (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 39 days.

(21) Appl. No.: 16/661,930

(22) Filed: Oct. 23, 2019

(65) Prior Publication Data

US 2021/0124916 A1 Apr. 29, 2021

(51) Int. Cl.
*G06V 40/10* (2022.01)
*G06V 10/25* (2022.01)
(Continued)

(52) U.S. Cl.
CPC ............ *G06V 40/103* (2022.01); *G06V 10/25* (2022.01); *G06V 10/44* (2022.01); *G06V 20/593* (2022.01);
(Continued)

(58) Field of Classification Search
CPC ............ G06K 9/00127; G06K 9/4628; G06K 9/6274; G06K 9/46; G06T 7/0012;
(Continued)

(56) References Cited

U.S. PATENT DOCUMENTS 5,528,698 A 6/1996 Kamei et al.
6,548,804 B1 4/2003 Yuhara et al.
(Continued)

FOREIGN PATENT DOCUMENTS

CN 109345770 A 2/2019
JP 4031296 B2 1/2008
(Continued)

OTHER PUBLICATIONS

Smartcomm Electronics PTE Ltd, "ADAS + DSM Systems (Advanced Driver Assistance Systems and Driver Status Monitoring Systems)", URL: https://www.smartcomm.biz/adas-dms-system/, 2018, Nine (9) total pages.

(Continued)

*Primary Examiner* — Pinalben Patel
(74) *Attorney, Agent, or Firm* — Crowell & Moring LLP

(57) ABSTRACT

A method for determining a presence of an occupant within a vehicle includes capturing, via a driver facing camera, video image data, including a plurality of image frames of a field-of-view of the driver facing camera. At least one area-of-interest within the image frames is defined, and a foreground pixel count of each image frame of each area-of-interest is determined. At each Nth image frame, an occupancy for each area of interest is determined based at least in part on the foreground pixel count. The occupancy indicates whether the occupant is present or absent in the respective area-of-interest. A history of the occupancy determination for each area-of-interest is maintained, and a final status for each area-of-interest is determined based on the respective history of occupancy. External indicators are initiated based on the final status determination.

24 Claims, 3 Drawing Sheets

(51) Int. Cl.
*G06V 10/44* (2022.01)
*G06V 20/59* (2022.01)
*B60R 11/00* (2006.01)
*B60R 11/04* (2006.01)
*B60K 28/02* (2006.01)

(52) U.S. Cl.
CPC ............ *G06V 20/597* (2022.01); *B60K 28/02* (2013.01); *B60R 11/04* (2013.01); *B60R 2011/0003* (2013.01)

(58) Field of Classification Search
CPC . G06T 2207/20081; G06T 2207/30024; G06T 2207/30096; G06T 1/00; G06T 2207/10056; G06T 2207/20084; G06T 7/0014; G01N 33/48
See application file for complete search history.

(56) References Cited

U.S. PATENT DOCUMENTS

| | | | |
|---|---|---|---|
| 8,063,786 | B2 | 11/2011 | Manotas, Jr. |
| 9,517,679 | B2 | 12/2016 | Frank et al. |
| 10,173,643 | B2 | 1/2019 | Myers et al. |
| 10,229,654 | B2 | 3/2019 | Kim et al. |
| 10,290,158 | B2 | 5/2019 | Jales Costa et al. |
| 2007/0154063 | A1 | 7/2007 | Breed |
| 2008/0317355 | A1* | 12/2008 | Luo ............. G06K 9/00832 382/199 |
| 2011/0274314 | A1* | 11/2011 | Yang ............. G06T 7/187 382/103 |
| 2013/0230230 | A1* | 9/2013 | Ajemba ............. G06K 9/00147 382/133 |
| 2014/0044328 | A1* | 2/2014 | Matsuda ............. G06T 7/0012 382/128 |
| 2015/0371095 | A1* | 12/2015 | Hartmann ............. G06K 9/6267 348/148 |
| 2017/0358093 | A1* | 12/2017 | Baltsen ............. G06K 9/6202 |

FOREIGN PATENT DOCUMENTS

| | | |
|---|---|---|
| KR | 10-1537961 B1 | 7/2015 |
| WO | WO 2013/111745 A1 | 8/2013 |

OTHER PUBLICATIONS

Aarian Marshall, "After the Fatal Crash, Uber Revamps Its Robo-Car Testing", URL: https://www.wired.com/story/self-driving-crash-uber-revamps-testing/, 2018, Five (5) total pages.

Stonkam, "Driver Fatigue Monitoring System Driving Status Detection", URL: https://www.stonkam.com/products/Driver-Fatigue-Monitoring-System-AD-A11.html, 2002, Eleven (11) total pages.

Provision, "Driver Fatigue Warning System and How It Works", URL: https://www.provisioncameramatics.com/driver-fatigue-warning-system-and-how-it-works/, 2019, Four (4) total pages.

Smarteye, "Driver Monitoring System | Interior Sensing for vehicle Integration", URL: https://smarteye.se/automotive-solutions/, 2019, Eleven (11) total pages.

Valeo, "Driver Monitoring", URL: https://www.valeo.com/en/monitoring/), 2019, Three (3) total pages.

Bergasa et al., "Real-Time System for Monitoring Driver Vigilance", 2004 IEEE Intelligent Vehicles Symposium, URL: http://www.robesafe.com/personal/sotelo/IV2004.pdf, 2004, pp. 78-83.

* cited by examiner

SYSTEM AND METHOD FOR MONITORING FOR DRIVER PRESENCE AND POSITION USING A DRIVER FACING CAMERA

FIELD OF THE INVENTION

The invention relates to improvements in monitoring for driver presence and position using driver facing cameras.

BACKGROUND

Driver facing cameras are sometimes used to record occupants of a vehicle such as the driver and/or passengers. These recordings may also be used to monitor driver behavior.

However current driver facing camera based monitoring systems suffer from an inefficient use of computing resources. This is in part due to the data intensive video streams being analyzed by such systems. Prior attempts at overcoming this drawback include a delayed analysis of the video stream in connection with a particular event occurring, such as for example, in connection with an accident. With this approach, only the video data in the time period of the accident is analyzed to determine driver behavior. As such, the driver behavior data is limited to the time of the accident and does not provide effective monitoring of other situations, including those not elsewise detected.

As such, there is a need in the art for a system and method that overcomes the aforementioned drawbacks and provides for the efficient use of computing resources in driver facing camera monitoring.

SUMMARY OF THE INVENTION

In one embodiment of the invention, a method for determining a presence of an occupant within a vehicle includes capturing, via a driver facing camera, video image data, including a plurality of image frames of a field-of-view of the driver facing camera. At least one area-of-interest within the image frames is defined, and a foreground pixel count of each image frame of each area-of-interest is determined. At each Nth image frame, an occupancy for each area-of-interest is determined based at least in part on the foreground pixel count. The occupancy indicates whether the occupant is present or absent in the respective area-of-interest. A history of the occupancy determination for each area-of-interest is maintained, and a final status for each area-of-interest is determined based on the respective history of occupancy. External indicators may be initiated based on the final status determination.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

Figure 1:
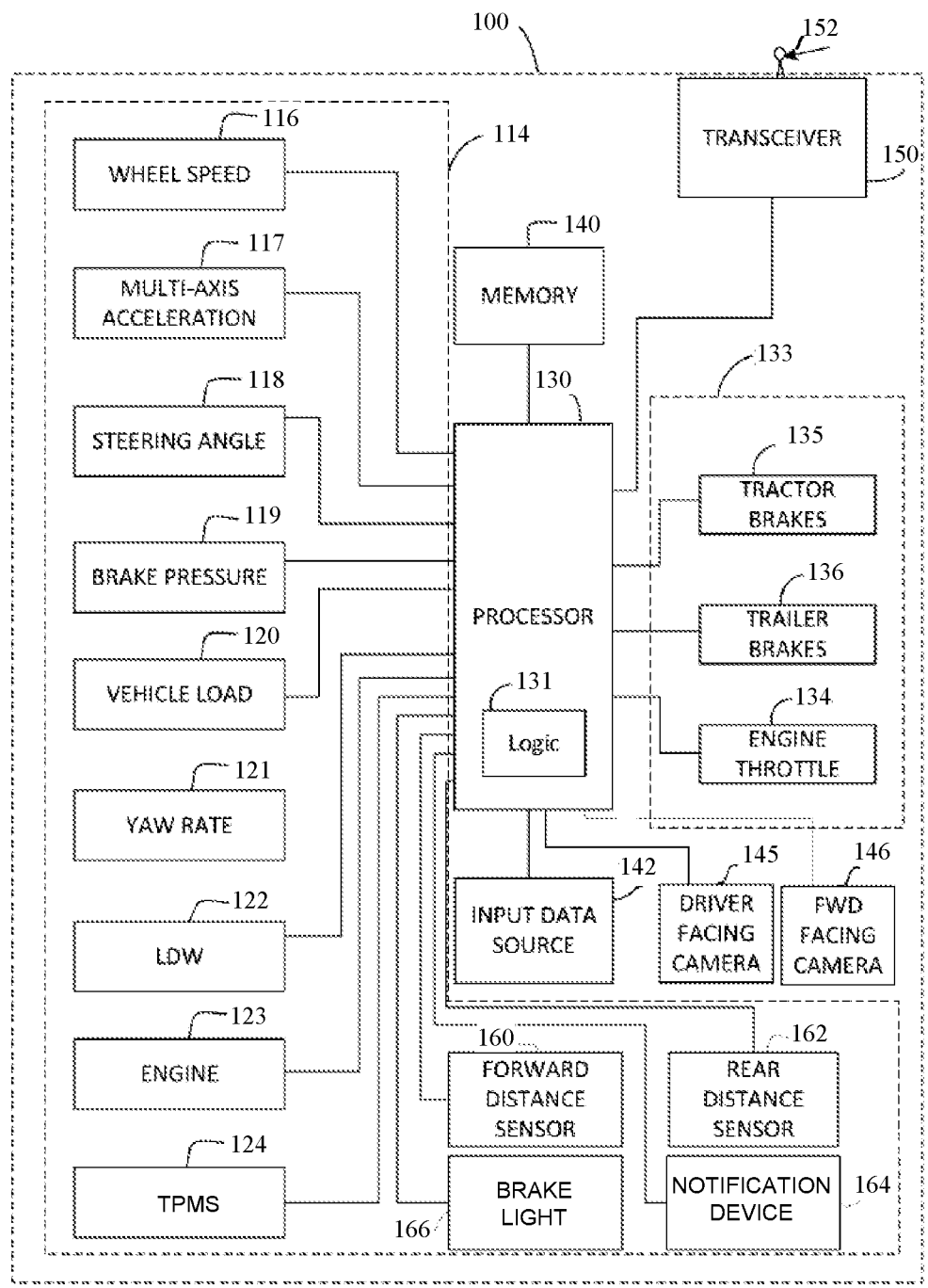
FIG. 1 is a block diagram that illustrates a vehicle-based computer system configured to implement one or more aspects of the invention.

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

In certain embodiments, the invention may be implemented by an on-vehicle event detection and reporting system that may include one or more driver facing cameras that are configured such that the field of view of the camera(s) captures a view the driver of the vehicle, and/or a view of other areas of the cabin, such as the controls of the vehicle, the front passenger seat, the area between the driver and the front passenger seats, the steering wheel, the driver side door, the passenger side door, etc. Still other embodiments may include cameras configured to capture other scenes relative to the vehicle. For instance, embodiments may include cameras configured to capture the scene in front of the vehicle, behind the vehicle, to either side of the vehicle, etc.

The event detection and reporting system may be further configured to collect and provide non-video data, including non-video event-based data corresponding to a detected driver or vehicle event that occurred at a particular point in time during a driving excursion. Such event-based data can include data collected from components of, or components interacting with, the event detection and reporting system.

These components can detect, in real time, driver or vehicle-related events that happen over the course of a driving excursion, or even outside of the driving excursion. The components can report such events to the detection and reporting system.

Examples of events that may be detected and/or reported to/collected by the event detection and reporting system in real time include safety events, for example and without limitation, excessive acceleration, excessive braking, exceeding speed limit, excessive curve speed, excessive lane departure, lane change without turn signal, loss of video tracking, LDW system warning, following distance alert, forward collision warning, collision mitigation braking, etc., and non-safety events, for example and without limitation, the driver logging in/out of a vehicle telematics system, the vehicle engine being on/off, the vehicle gear being in park/drive, the parking brake being on/off, etc. Other events may also include, for example and without limitation, the presence of an unauthorized occupant.

In accordance with an embodiment, the event detection and reporting system may use data collected directly from vehicle components (e.g., devices, sensors, or systems), and data collected from an analysis of vehicle video, to generate event datasets that correspond in time with one or more detected events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames whose timelines span or overlap the time when the event was detected/collected (in these scenarios, the time may be calculated based on the video frame or frames from which the event object was derived).

The driver facing camera, in particular, can be utilized to monitor for and detect driver-related and/or passenger-related conditions or events, including for example and without limitation, the presence of a person in the driver's seat; the presence of the person in the passenger seat; the ingress/egress of the person through the driver's side door; the ingress/egress of the person through the passenger side door; the presence and/or orientation of the person's hand(s) on or near the steering wheel; the rising up of the person out of a seat; the reaching by a person to the central control or other area of the dashboard; the reaching by a person to the passenger seat/glove box or other area; the exiting of the person to the rear cab or other area; the person entering from the rear cab or other area; the person not being in a normal or otherwise acceptable sitting position, such as reaching for something on the floor, or leaning to the left or right (asleep or unconscious), etc.

These monitored conditions can be used by the detection and reporting system to provide alerts including alerts indicating: driver's seat occupied, passenger seat occupied, driver out-of-position (distracted), driver vacating the driver's seat, etc. Such alerts may include: audible alarms, haptic vibrations, indicator lights, etc. These monitored events may also be reported to a central vehicle control function or a fleet management function. This reporting may include continuous messages indicating certain measurements of the driver's or passenger's position or movement, data items related to an event of interest (e.g., safety events, etc.) as well as video recorded from the driver facing camera and/or other video devices on the vehicle around the time of the event of interest.

The monitored condition of the driver's seat occupied can be used as an input to an anti-rollaway function of the vehicle. The anti-rollaway function can automatically cause the vehicle parking brake to engage when it is determined that each of the following events has occurred: the vehicle has been stopped, the engine turned off, and the driver has failed to engage the parking brake before vacating the driver's seat.

The particular invention disclosed and claimed herein relates to the use of driver facing camera imagery to monitor such conditions. In certain embodiments, such monitoring is achieved via the application of frame-to-frame differencing and edge detection techniques to areas of interest, or zones, within the field-of-view of the driver facing camera. The different zones are characterized by the locations where the monitored conditions are likely to be detected. An aspect of the invention is that each of these zones can be evaluated independently for foreground/background pixels, with the combined results indicating the monitored conditions of interest. For example, a significant number of foreground pixels in a seat combined with a low number of foreground pixels in the steering wheel area can indicate the presence of a driver whose hands are not on the steering wheel. In this manner, conditions of interest can be determined by the selective identification of foreground/background pixels in particular zones rather than by full image analysis. In addition, the zones where conditions of interest are identified can be used to limit more robust image analysis (e.g., facial recognition, etc.) to those zones. Accordingly, processing efficiency can be increased and computing resources can be conserved.

Referring first to FIG. 1, by way of overview a schematic block diagram is provided illustrating details of an event detection and reporting system configured to be used in accordance with one or more exemplary embodiments of the invention. The in-vehicle event detection and reporting system 100 may be adapted to detect a variety of operational parameters and conditions of the vehicle and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 100 of FIG. 1 may include one or more devices or systems 114 for providing input data indicative of one or more operating parameters or one or more conditions of a commercial vehicle. Alternatively, the event detection and reporting system 100 may include a signal interface for receiving signals from the one or more devices or systems 114, which may be configured separate from system 100. For example, the devices 114 may be one or more sensors, such as but not limited to, one or more wheel speed sensors 116, one or more acceleration sensors such as multi-axis acceleration sensors 117, a steering angle sensor 118, a brake pressure sensor 119, one or more vehicle load sensors 120, a yaw rate sensor 121, a lane departure warning (LDW) sensor or system 122, one or more engine speed or condition sensors 123, and a tire pressure (TPMS) monitoring system 124. The event detection and reporting system 100 may also utilize additional devices or sensors, including for example a forward distance sensor 160 and a rear distance sensor 162 (e.g., radar, lidar, etc.). Other sensors and/or actuators or power generation devices or combinations thereof may be used or otherwise provided as well, and one or more devices or sensors may be combined into a single unit as may be necessary and/or desired.

The event detection and reporting system 100 may also include brake light(s) 166 and/or notification device(s) 164, and may be usable to provide headway time/safe following distance warnings, lane departure warnings, and warnings relating to braking and/or obstacle avoidance events.

The event detection and reporting system 100 may also include a logic applying arrangement such as a controller or processor 130 and control logic 131, in communication with the one or more devices or systems 114. The processor 130 may include one or more inputs for receiving input data from the devices or systems 114. The processor 130 may be adapted to process the input data and compare the raw or processed input data to one or more stored threshold values or desired averages, or to process the input data and compare the raw or processed input data to one or more circumstance-dependent desired value(s).

The processor 130 may also include one or more outputs for delivering a control signal to one or more vehicle systems 133 based on the comparison. The control signal may instruct the systems 133 to provide one or more types of driver assistance warnings (e.g., warnings relating to braking and or obstacle avoidance events) and/or to intervene in the operation of the vehicle to initiate corrective action. For example, the processor 130 may generate and send the control signal to an engine electronic control unit or an actuating device to reduce the engine throttle 134 and slow the vehicle down. Further, the processor 130 may send the control signal to one or more vehicle brake systems 135, 136 to selectively engage the brakes (e.g., a differential braking operation). A variety of corrective actions may be possible and multiple corrective actions may be initiated at the same time.

The event detection and reporting system 100 may also include a memory portion 140 for storing and accessing system information, such as for example the system control logic 131. The memory portion 140, however, may be separate from the processor 130. The sensors 114 and processor 130 may be part of a preexisting system or use components of a preexisting system.

The event detection and reporting system 100 may also include a source of input data 142 indicative of a configuration/condition of a commercial vehicle. The processor 130 may sense or estimate the configuration/condition of the vehicle based on the input data, and may select a control tuning mode or sensitivity based on the vehicle configuration/condition. The processor 130 may compare the operational data received from the sensors or systems 114 to the information provided by the tuning.

In addition, the event detection and reporting system 100 is operatively coupled with one or more driver facing imaging devices, shown in the example embodiment for simplicity and ease of illustration as a single driver facing camera 145 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 100 such as a forward facing camera 146 to record images of the roadway ahead of the vehicle. In the example embodiments, driver-related data can be collected directly using the driver facing camera 145 in accordance with a detected driver head positon, hand position, or the like, within the vehicle being operated by the driver. In addition, driver identity can be determined based on facial recognition technology and/or body/posture template matching.

Still yet further, the event detection and reporting system 100 may also include a transmitter/receiver (transceiver) module 150 such as, for example, a radio frequency (RF) transmitter including one or more antennas 152 for wireless communication of the automated control requests, GPS data, one or more various vehicle configuration and/or condition data, or the like between the vehicles and one or more destinations such as, for example, to one or more services (not shown) having a corresponding receiver and antenna. The transmitter/receiver (transceiver) module 150 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 is operative to combine selected ones of the collected signals from the sensor systems described herein into processed data representative of higher level vehicle condition and/or driver condition data such as, for example, data from the multi-axis acceleration sensors 117 may be combined with the data from the steering angle sensor 118 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, average ACC usage event data, late speed adaptation (such as that given by signage or exiting) data, and driver related data.

The event detection and reporting system 100 of FIG. 1 is suitable for executing embodiments of one or more software systems or modules that perform vehicle brake strategies and vehicle braking control methods according to the subject application. The example event detection and reporting system 100 may include a bus or other communication mechanism for communicating information, and a processor 130 coupled with the bus for processing information. The computer system includes a main memory 140, such as random access memory (RAM) or other dynamic storage device for storing instructions to be executed by the processor 130, and read only memory (ROM) or other static storage device for storing other static information and instructions for the processor 130. Other storage devices may also suitably be provided for storing information and instructions as necessary or desired.

Instructions may be read into the main memory 140 from another computer-readable medium, such as another storage device of via the transceiver 150. Execution of the sequences of instructions contained in main memory 140 causes the processor 130 to perform the process steps described herein. In an alternative implementation, hard-wired circuitry may be used in place of or in combination with software instructions to implement the invention. Thus implementations of the example embodiments are not limited to any specific combination of hardware circuitry and software.

Figure 2:
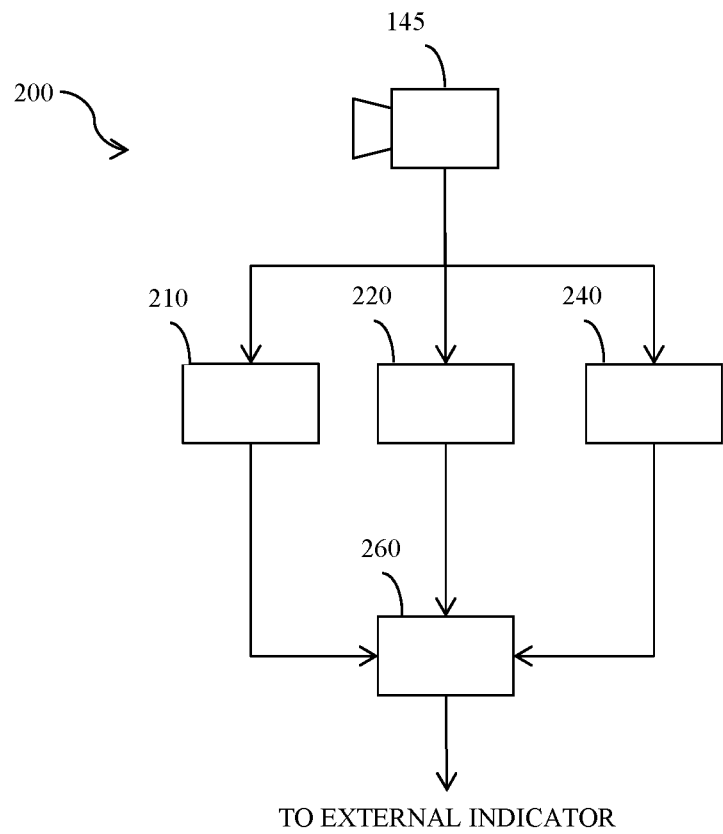
FIG. 2 is a schematic diagram of systems for monitoring for driver presence and position according to one or more aspects of the invention.

Referring now to FIG. 2, a simplified schematic block diagram is provided illustrating details of a system 200 for monitoring for driver presence and position in the vehicle via the event detection and reporting system of FIG. 1.

The system includes the driver facing camera 145, a mask module 210, a difference module 220, an edge extraction module 240, and a status module 260.

The mask module 210 is configured to receive image data from the driver facing camera 145. The image data may comprise a series of time dependent image frames, each having a plurality of pixels, as is known in the art.

The mask module 210 is further configured to divide received image frames into a plurality of areas of interest or zones. Each area-of-interest may be defined by a many-sided polygon whose vertices correspond to pixel locations. The plurality of zones may include areas within the image frame where a person might be expected to be present, or that could indicate cause for concern if a person were found there or not found there. An exemplary zone may include, for example and without limitation, the seat areas of the vehicle, the steering wheel area, the center dashboard area, the area above the seat where a persons' head is likely to be, and the areas to either side of the seats.

The mask module 210 may further define an area-of-interest mask, in which each image pixel location within the area-of-interest polygon is indicated with the value (1) and each image pixel location outside of the area-of-interest polygon is indicated with the value (0). The area-of-interest masks may be defined for each area-of-interest of a respective image frame, and may be associated therewith. The mask module 210 may also define, for the image frame, a processing mask, in which each image pixel location within a plurality of areas of interest is indicated with the value (1) and each image pixel location outside of the plurality of areas of interest is indicated with the value (0). Thus, the processing mask may represent the logical OR of the area-of-interest masks for the plurality of areas of interest of the image frame.

The processing mask may be utilized such that each image pixel of the associated image frames that is indicated with the value (1) is processed in accordance with the principles of the invention, whereas each image pixel indicated with the value (0) is not so processed. Importantly, each of the areas of interest or zones can be evaluated independently of each other area-of-interest for the presence of a person. The results of the multiple independent evaluations can also be combined to identify conditions of interest.

Returning now to FIG. 2, the mask(s) associated with the image frame(s) may be provided with the image frame(s) to the difference module 220 for processing. In particular, the difference module 220 is configured to evaluate the pixels within an area-of-interest to determine whether each pixel is a foreground pixel or a background pixel.

In at least one embodiment, the difference module 220 utilizes frame-to-frame differencing techniques to determine whether pixels are foreground pixels or background pixels. Image pixels for which an observed characteristic value does not change significantly from frame-to-frame over a specified time period, e.g., a specified number of successive image frames, are identified and labeled as background pixels. Image pixels for which the observed characteristic value does change significantly from frame-to-frame over the specified time period are identified and labeled as foreground pixels. The observed characteristic(s) may include one or more of: brightness, RGB color, hue, and the like.

In some embodiments, determining whether observed characteristic values change significantly from frame-to-frame can involve the determination of a pixel variance value. Each pixel location may be associated with a respective pixel variance value, which may represent a statistic of the variability of the characteristic value. A higher pixel variance value can represent more historical variability in the characteristic value of the associated pixel location. A lower pixel variance can represent more historical consistency in the characteristic value of the associated pixel location. The pixel variance value can be continuously updated from frame-to-frame to reflect a running pixel variance value.

Because the movement of a person within the area-of-interest tends to cause significant changes in the observed characteristic(s) of the image pixels that include the person and the area immediately surrounding that person, a significant number of foreground pixels in the area-of-interest for a significant length of time tends to indicate the presence of a person in that area-of-interest. However, sometimes pixels may be labeled as foreground when the changes in the observed characteristic value are not caused by the movements of a person, but rather, for example, by noise due to lighting/exposure/gain changes, etc. These pixels are more likely to be isolated and further apart, whereas foreground pixels resulting from a person moving are more likely to be more clustered, closely spaced, or connected.

Accordingly, the difference module 220 may also be configured to remove such noise pixels and maintain the non-noise foreground pixels. In some embodiments, the difference module utilizes erosion techniques to remove undesired noise pixels and dilation techniques to restore eroded non-noise foreground pixels.

In some embodiments, the difference module 220 may count the number of pixels detected before and after applying dilation, and calculate the ratio of the number of pixels after dilation to the number of pixels before dilation. Since the noise pixels are normally isolated, and the foreground pixels generated by a person's movement are normally more closely spaced, the increase of pixels caused by the dilation will be larger when there are more noise pixels and smaller when there are more foreground pixels. The ratio is larger when more of the foreground pixels are noise, and the ratio is smaller when more of the foreground pixels are related to conditions of interest. The difference module 220 accordingly determines from the ratios which pixels are foreground pixels and which are noise.

In certain conditions, a person may not be readily detectable by this background/foreground method. Such conditions may include: when a person is very still, when the observed characteristic(s) of a person's clothing, etc. are very similar to the observed characteristic(s) of the vehicle seat covering, etc. To enable detection of a person under such conditions, the system 200 also may include the edge extraction module 240 that is configured to evaluate the pixels within the area-of-interest to determine whether each pixel is an edge pixel or a not-edge pixel. In at least one embodiment, this involves the utilization of known edge detection techniques, preferably the use of a Sobel edge operator.

Returning to FIG. 2, the status module 260 is configured to generate and maintain a log (e.g., a history buffer) of the pixel locations for each area-of-interest. For each pixel location, the log associates the pixel location with an identifier that indicates whether the pixel is determined to be foreground or background. The identifier may also indicate whether the pixel is determined to be edge or not. The log is also utilized to keep track of how the identifier may change over the specified time period.

The status module 260 is further configured to determine a final status for the area-of-interest based on the indicator history over the specified time period. The specified time period may on the order of 2 seconds, and is preferably at least 1 second.

The final status indicates the presence or non-presence of a person in the area-of-interest. The final status may be determined by maintaining a foreground pixel count for the specified time period and updating the final status to indicate the presence of a person when the foreground pixel count exceeds a predetermined foreground count threshold. The final status may also be determined by maintaining an edge pixel count for the specified time period and updating the final status to indicate the presence of a person when the edge pixel count exceeds a predetermined edge count threshold. Otherwise, the final status may indicate non-presence.

The final status indicators for each area-of-interest may be provided to a controller (e.g., processor 130) as driver-related and/or passenger-related data from which the controller may utilize to determine or otherwise detect driver-related and/or passenger-related conditions or events, as discussed above. The controller may further actuate one or more external indicators in response to and based on the provided driver-related and/or passenger-related data. The external indicators may include, for example and without limitation, audible alarms, haptic vibrations, indicator lights, etc. The controller may further actuate a vehicle braking device, such as a parking brake, in response to and based on one or more detected conditions, including but not limited to a determination that the driver has failed to engage the parking brake before vacating the driver's seat. Other conditions that may be considered in engaging the parking brake may include but are not limited to: whether the vehicle is stopped, and whether the engine is turned off. As discussed herein, the monitored circumstances and/or events may also be provided to a central vehicle control or a remote server, e.g., a fleet management server, for further action based thereon.

Figure 3:
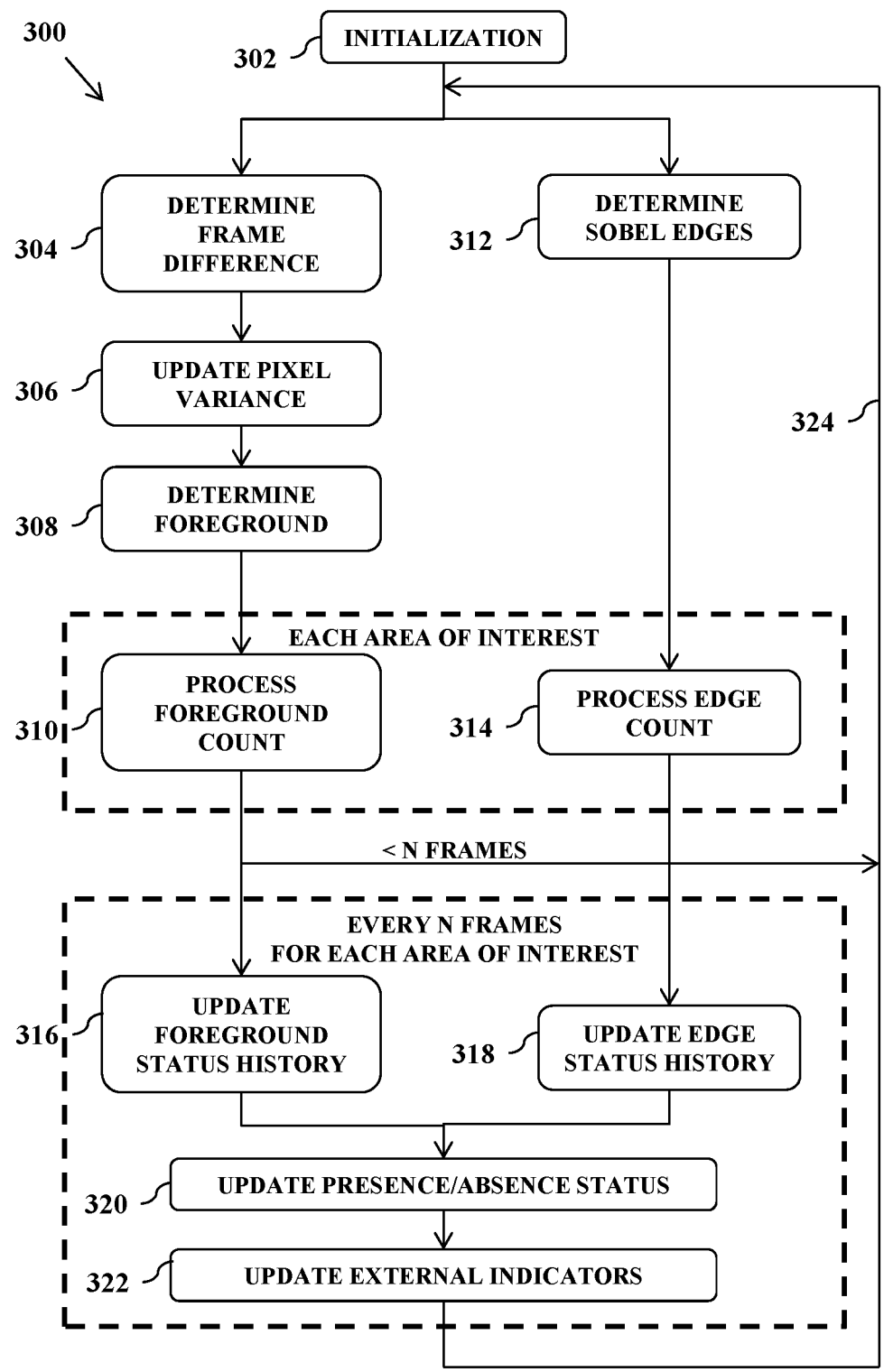
FIG. 3 is an exemplary flow-chart of methods for monitoring for driver presence and position according to one or more aspects of the invention.

Turning now to FIG. 3, an exemplary process 300 for monitoring driver presence and position in the vehicle will now be discussed. It will be understood that, while reference is made to the driver, the principles of the invention can be applied to any occupant of the vehicle or other subject within the field of view of the driver facing camera 145, or portion thereof (e.g., hands, face, arms, etc.). Moreover, the principles of the invention can likewise be applied to other cameras (e.g., the forward facing camera 146) of the event detection and reporting system 100.

The process 300 begins at Step 302 executed at image frame time T(0). At Step 302, the processor 130 performs any initializations required for processing at subsequent image frame times. Initialization may include retrieving an initial image frame and defining the areas of interest within the image frames, including setting up the area-of-interest masks as discussed above so as to process only the areas of interest via the subsequent steps. Initialization may also include initializing the pixel variance value, discussed herein, at each pixel location of the initial image frame image to zero(0). Initialization may further include initializing the history buffer, as discussed herein. Initialization may also include setting the final status indicators to ABSENT and setting any external indicators to OFF.

Turning now to Steps 304 through 314, these steps are executed for each image frame within the specified time period. In other words, Steps 304 through 312 together comprise a subroutine that is executed for each image frame Image (t) starting with an initial time t=1 to a final time t=n. The image frames may have an input frame rate of approximately 5-10 frames per second.

At Step 304, the difference between the characteristic value at each evaluated pixel location in the current image frame Image(t) and the characteristic value at each corresponding pixel location in the previously image frame Image(t−1) is determined. As discussed above, the difference is evaluated for each pixel location for which there is an associated mask value of (1) and the difference is not evaluated for pixel locations whose associated mask values are (0). Moreover, the square of each difference is also determined.

Accordingly, at each evaluated pixel location, the difference between respective characteristic values is determined according to the following:

$$\text{Diff} = \text{PixelCV}(t) - \text{PixelCV}(t-1), \text{ and}$$

$$\text{Diff}^2 = \text{Diff}*\text{Diff},$$

where PixelCV(t) is the characteristic value at the current pixel location of the current image frame, Image(t), and PixelCV(t−1) is the characteristic value at the current pixel location in a preceding image frame, Image(t−1).

At Step 306, the pixel variance value at each evaluated pixel location is determined and the running pixel variance value is updated accordingly. As discussed herein, the running variance is a representative statistic of the variability of the characteristic value over the specified period, e.g., 2 seconds. The running pixel variance value at each evaluated pixel location, RVPixel, may be determined as follows:

$$\text{RVPixel} = (1-\text{Weight})*\text{PrevRVPixel} + \text{Weight}*\text{Diff}^2$$

where PrevRVPixel is the running pixel variance value at the current pixel location from the previous image frame Image (t−1), and Weight is a constant that affects how quickly RVPixel is affected by new $\text{Diff}^2$ values.

At Step 308, each evaluated pixel location is labeled as a background pixel or a foreground pixel. As discussed above, a background pixel is a pixel whose characteristic value has not changed significantly from the previous frame to the current frame, whereas a foreground pixel is a pixel whose value has changed significantly from the previous frame to the current frame. The location of each background pixel is labeled with a value of zero (0) and the location of each foreground pixel is labeled with a value of one (1).

In some embodiments, the pixel location is labeled as foreground if it is determined that both of the following conditions are met for the pixel location:

(1) $\text{Diff}^2$ is greater than a predetermined threshold value, and (2) $\text{Diff}^2$ is greater than a constant K times RVPixel.

At Step 310, the foreground pixel count is determined for each area-of-interest of the current image frame. In at least one embodiment, this includes determining the logical AND at every corresponding pixel location between the foreground/background identification value, e.g., (1) or (0), and each area-of-interest mask. Accordingly, each pixel location where the logical AND has a value of (1) represents a foreground pixel within that area-of-interest. Moreover, each pixel location where the logical AND has a value of (0) represents a background pixel within that area-of-interest—or a pixel outside the area-of-interest. The pixels with the value of (1) are counted separately for each area-of-interest, and the count is recorded as the respective foreground pixel count.

Moreover, as discussed above, additional methodologies may be utilized to determine or confirm that a foreground pixel belongs to an object of interest. For example, erosion and/or dilation techniques may be so utilized.

Step 310 may further include applying a low-pass filter to the foreground pixel counts in each area-of-interest. The low-pass filter may average together several consecutive samples within a data series to smooth out noise. The low-pass filter may utilize a sample interval of approximately 0.5 seconds. For example, in an embodiment having an input frame rate of 10 frames per second, the low-pass filter may sum the foreground pixel counts in the area-of-interest from frame times (t−s−1) through (t), where (t) is the current frame time, and divide the resulting sum by (s), where (s) represents number of samples summed.

At Step 312, the probable pixel locations of edges within each area of interest are determined. As discussed above, this involves determining whether pixels are edge pixels or not. In at least one embodiment, a Sobel edge operator may be utilized to make the determination. The output of the Sobel edge operation is a label at each evaluated pixel location that has a value of one (1) at each pixel location where the operator determines a high probability of an edge, and a value of zero (0) at each evaluated pixel location where the operator determines a low probability of an edge.

At Step 314, the edge pixel count is determined for each area-of-interest of the current image frame. In at least one embodiment, this includes determining the logical AND at every corresponding pixel location between the edge pixel value, e.g., (1) or (0), and each area-of-interest mask. Accordingly, each pixel location where the logical AND has a value of (1) represents an edge pixel within that area-of-interest. Moreover, each pixel location where the logical AND has a value of (0) represents a non-edge pixel within that area-of-interest—or a pixel outside the area-of-interest.

The pixels with the value of (1) are counted separately for each area-of-interest, and the count is recorded as the respective edge pixel count.

Step 314 may further include applying a low-pass filter to the edge pixel counts in each area-of-interest. The low-pass filter may average together several consecutive samples within a data series to smooth out noise. The low-pass filter may utilize a sample interval of approximately 0.5 seconds.

Turning now to Steps 316 through 322, these steps are executed periodically, i.e., every N image frames. In operation, these steps effectuate an evaluation of the foreground and/or edge pixel counts in each area-of-interest within a recent time interval, update the final status indicators, and update the external indicators. The status evaluation rate is preferably on the order of 0.5 seconds, or every 3-5 image frames.

At Step 316, the filtered foreground pixel count is compared with the foreground count threshold. A filtered foreground pixel count that is equal to or greater than the foreground count threshold indicates that the area-of-interest is occupied, e.g., presence of a person. A filtered foreground pixel count that is below the foreground count threshold indicates that the area-of-interest is not occupied, e.g., absence of a person. This indication of presence or absence of a person in the area-of-interest is recorded in a foreground status history.

At Step 318, the filtered edge pixel count is compared with the edge count threshold. A filtered edge pixel count that is equal to or greater than the edge count threshold indicates that the area-of-interest is occupied, e.g., presence of a person. A filtered edge pixel count that is below the edge count threshold indicates that the area-of-interest is not occupied, e.g., absence of a person. This indication of presence or absence of a person is recorded in an edge status history.

At Step 320, a final status for each area-of-interest is determined based on the foreground status and edge status histories. These histories are combined to determine the final status, i.e., the presence or absence of a person, for each area-of-interest over a history interval. Preferably, the history interval is on the order of 2 seconds. In at least one embodiment, a final status of PRESENT requires that presence is indicated at a majority of sample times within the history interval.

At Step 322, any external indicators regarding presence or absence of a person in each monitored area-of-interest are updated. These external indicators may include: audible alarms, haptic vibrations, indicator lights, etc. Monitored events may also be reported to a central vehicle control function or a fleet management function. This reporting may include continuous messages indicating certain measurements of the driver's or passenger's position or movement, data items related to an event of interest as well as video recorded from the driver facing camera around the time of an event. At Step 324, the next image frame is processed in accordance with the invention.

It should further be appreciated that the driver-related data and/or conditions or events may be transmitted by the on-vehicle event detection and reporting system to a remote server using, for example, wireless transceiver 150 of FIG. 1. This transmission of data may be done automatically in response to the occurrence of a detected event, or on request.

Once the correlated event data has been transmitted from the on-vehicle event detection and reporting system to the remote server, whether automatically or upon request, the data may be provided to a user-side viewing portal or application. In certain embodiments, the viewing portal may comprise a web application provided on a user computer. It should further be appreciated that the viewing portal or application may be a dedicated software program executing on a computer or mobile device that is accessible to the user.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 130 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition and further in accordance with the descriptions herein, the term "logic," as used herein, with respect to FIG. 1, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

Also in accordance with the descriptions herein, the term "camera," as used herein with respect to driver facing cameras or otherwise, includes cameras and other digital imaging devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a presence of an occupant within a vehicle, comprising:
    capturing, via a driver facing camera, video image data, including a plurality of image frames of a field-of-view of the driver facing camera;
    defining at least one area-of-interest within the image frames;
    determining a foreground pixel count of each image frame of each area-of-interest by counting the number of pixels in the foreground of the image frame;
    determining, at each Nth image frame, an occupancy for each area-of-interest based at least in part on the foreground pixel count, the occupancy indicating whether the occupant is present or absent in the respective area-of-interest;
    maintaining a history of the occupancy determination for each area-of-interest; and
    determining a final status for each area-of-interest based on the respective history of occupancy.

2. The method of claim 1, further comprising:
    determining an edge pixel count of each image frame of each area-of-interest,
    wherein the determination of the occupancy is also based on the edge pixel count.

3. The method of claim 2, wherein determining the edge pixel count is via application of a Sobel operator to the image frame.

4. The method of claim 1, wherein determining the foreground pixel count is via frame-to-frame differencing.

5. The method of claim 1, wherein every Nth image frame is from every 5 image frames to every 20 image frames.

6. The method of claim 1, wherein defining the area-of-interest includes generating an area-of-interest mask, and wherein the foreground pixel count is determined based on a logical AND operation applied to the area-of-interest mask and a foreground pixel identification.

7. The method of claim 1, wherein defining the area-of-interest includes generating an area-of-interest mask, and wherein the edge pixel count is determined based on a logical AND operation applied to the area-of-interest mask and an edge pixel identification.

8. The method of claim 1, wherein determining the foreground pixel count of each area-of-interest includes tracking an observed characteristic value of each pixel within each area-of-interest for significant changes over a predetermined period.

9. The method of claim 1, further comprising:
    initiating external indicators and/or vehicle functions based on the final status determination.

10. The method of claim 9, wherein at least one of the vehicle functions initiated is an anti-rollaway function.

11. The method of claim 9, wherein the final status of each area-of-interest is determined independently, but wherein the external indicators and/or vehicle functions are initiated based on a combined consideration of the respective final statuses of a plurality of areas-of-interest.

12. The method of claim 11, wherein at least one of the vehicle functions initiated is an anti-rollaway function.

13. A system for determining a presence of an occupant within a vehicle, comprising:
    a driver facing camera configured to capture video image data, including a plurality of image frames of a field-of-view;
    a mask module configured to define at least one area-of-interest within the image frames;
    a difference module configured to determine a foreground pixel count of each image frame of each area-of-interest by counting the number of pixels in the foreground of the image frame; and
    a status module configured to:
        determine, at each Nth image frame, an occupancy for each area-of-interest based at least in part on the foreground pixel count, the occupancy indicating whether the occupant is present or absent in the respective area-of-interest,
        maintain a history of the occupancy determination for each area-of-interest, and
        determine a final status for each area-of-interest based on the respective history of occupancy.

14. The system of claim 13, further comprising:
    an edge extraction module configured to determine an edge pixel count of each image frame of each area-of-interest, wherein the determination of the occupancy is also based on the edge pixel count.

15. The system of claim 14, wherein determining the edge pixel count is via application of a Sobel operator to the image frame.

16. The system of claim 13, wherein determining the foreground pixel count is via frame-to-frame differencing.

17. The system of claim 13, wherein every Nth image frame is from every 5 image frames to every 20 image frames.

18. The system of claim 13, wherein defining the area-of-interest includes generating an area-of-interest mask, and wherein the foreground pixel count is determined based on a logical AND operation applied to the area-of-interest mask and a foreground pixel identification.

19. The system of claim 13, wherein defining the area-of-interest includes generating an area-of-interest mask, and wherein the edge pixel count is determined based on a logical AND operation applied to the area-of-interest mask and an edge pixel identification.

20. The system of claim 13, wherein determining the foreground pixel count of each area-of-interest includes tracking an observed characteristic value of each pixel within each area-of-interest for significant changes over a predetermined period.

21. The system of claim 13, further comprising:
    a controller configured to initiate external indicators and/or vehicle functions based on the final status determination.

22. The system of claim 21, wherein at least one of the vehicle functions initiated is an anti-rollaway function.

23. The system of claim 21, wherein the final status of each area-of-interest is determined independently, but wherein the external indicators and/or vehicle functions are initiated based on a combined consideration of the respective final statuses of a plurality of areas-of-interest.

24. The system of claim 23, wherein at least one of the vehicle functions initiated is an anti-rollaway function.

\* \* \* \* \*